US008443962B2

(12) United States Patent
Kaneyama et al.

(10) Patent No.: US 8,443,962 B2
(45) Date of Patent: May 21, 2013

(54) REMOVABLE UNIT AND IMAGE FORMING APPARATUS

(75) Inventors: Kiyotoshi Kaneyama, Kanagawa (JP); Yoshihiro Enomoto, Kanagawa (JP); Kazuyuki Yagata, Kanagawa (JP); Kenji Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 99 days.

(21) Appl. No.: 13/214,697

(22) Filed: Aug. 22, 2011

(65) Prior Publication Data

US 2012/0199443 A1 Aug. 9, 2012

(30) Foreign Application Priority Data

Feb. 4, 2011 (JP) ................................ 2011-022291

(51) Int. Cl.
*B65G 45/12* (2006.01)

(52) U.S. Cl.
USPC ........... 198/496; 198/497; 399/101; 15/256.5

(58) Field of Classification Search
USPC .................. 198/496, 497, 499, 494; 399/101, 399/121, 302, 308, 349; 15/88.1, 256.5
See application file for complete search history.

(56) References Cited

U.S. PATENT DOCUMENTS

| | | | | |
|---|---|---|---|---|
| 4,640,608 | A * | 2/1987 | Higaya et al. | 399/102 |
| 5,669,041 | A * | 9/1997 | Thayer et al. | 399/102 |
| 5,784,674 | A * | 7/1998 | Iseki et al. | 399/297 |
| 5,873,016 | A * | 2/1999 | Kurokawa et al. | 399/297 |
| 6,904,244 | B2 * | 6/2005 | Azami et al. | 399/30 |
| 6,925,282 | B2 * | 8/2005 | Drawe et al. | 399/349 |
| 7,035,582 | B2 * | 4/2006 | Suda et al. | 399/346 |
| 7,127,201 | B2 * | 10/2006 | Takenouchi et al. | 399/297 |
| 7,162,178 | B2 * | 1/2007 | Takiguchi et al. | 399/101 |
| 7,493,075 | B2 * | 2/2009 | Shintani et al. | 399/346 |
| 7,693,465 | B2 * | 4/2010 | Azami | 399/267 |
| 2005/0058464 | A1 * | 3/2005 | Azami et al. | 399/30 |
| 2006/0067741 | A1 * | 3/2006 | Azami | 399/267 |
| 2009/0047046 | A1 * | 2/2009 | Azami | 399/270 |

FOREIGN PATENT DOCUMENTS

| | | | |
|---|---|---|---|
| JP | 2-26232 | A | 1/1990 |
| JP | 2-26232 | B2 | 6/1990 |
| JP | 4240453 | B2 | 3/2009 |

* cited by examiner

*Primary Examiner* — Gene Crawford
*Assistant Examiner* — Keith R Campbell
(74) *Attorney, Agent, or Firm* — Sughrue Mion, PLLC

(57) ABSTRACT

A removable unit includes an endless belt-like member; a first contact member that contacts an inner surface of the belt-like member; a second contact member disposed upwardly of the first contact member in a direction of gravitational force when the removable unit is mounted to a body of an image forming apparatus; a first cleaning member disposed between the first contact member and the second contact member; and a second cleaning member disposed between the first cleaning member and the second contact member. The first cleaning member prevents an adherent cleaned off by the second cleaning member from moving downward in the direction of gravitational force along an inner peripheral surface of the belt-like member.

10 Claims, 4 Drawing Sheets

REMOVABLE UNIT AND IMAGE FORMING APPARATUS

CROSS-REFERENCE TO RELATED APPLICATIONS

This application is based on and claims priority under 35 USC 119 from Japanese Patent Application No. 2011-022291 filed Feb. 4, 2011.

BACKGROUND

Technical Field

The present invention relates to a removable unit and an image forming apparatus.

SUMMARY

According to an aspect of the invention, there is provided a removable unit that is mountable to and removable from a body of an image forming apparatus. The removable unit includes an endless belt-like member that rotates when driving force is transmitted thereto from the body of the image forming apparatus; a first contact member that contacts an inner surface of the belt-like member; a second contact member disposed at a downstream side in a direction of rotation of the belt-like member, the second contact member being disposed upwardly of the first contact member in a direction of gravitational force when the removable unit is mounted to the body of the image forming apparatus, the second contact member contacting the inner surface of the belt-like member; a first cleaning member disposed between the first contact member and the second contact member, the first cleaning member contacting an inner peripheral surface of the belt-like member to clean off an adherent on the inner peripheral surface of the belt-like member; and a second cleaning member disposed between the first cleaning member and the second contact member, the second cleaning member contacting the inner peripheral surface of the belt-like member to clean the inner peripheral surface of the belt-like member, the second cleaning member cleaning off an adherent that has stuck on the inner peripheral surface of the belt-like member and that has passed the first cleaning member. The first cleaning member prevents the adherent cleaned off by the second cleaning member from moving downward in the direction of gravitational force along the inner peripheral surface of the belt-like member.

BRIEF DESCRIPTION OF THE DRAWINGS

Exemplary embodiments of the present invention will be described in detail based on the following figures, wherein.

DETAILED DESCRIPTION

Figure 1:
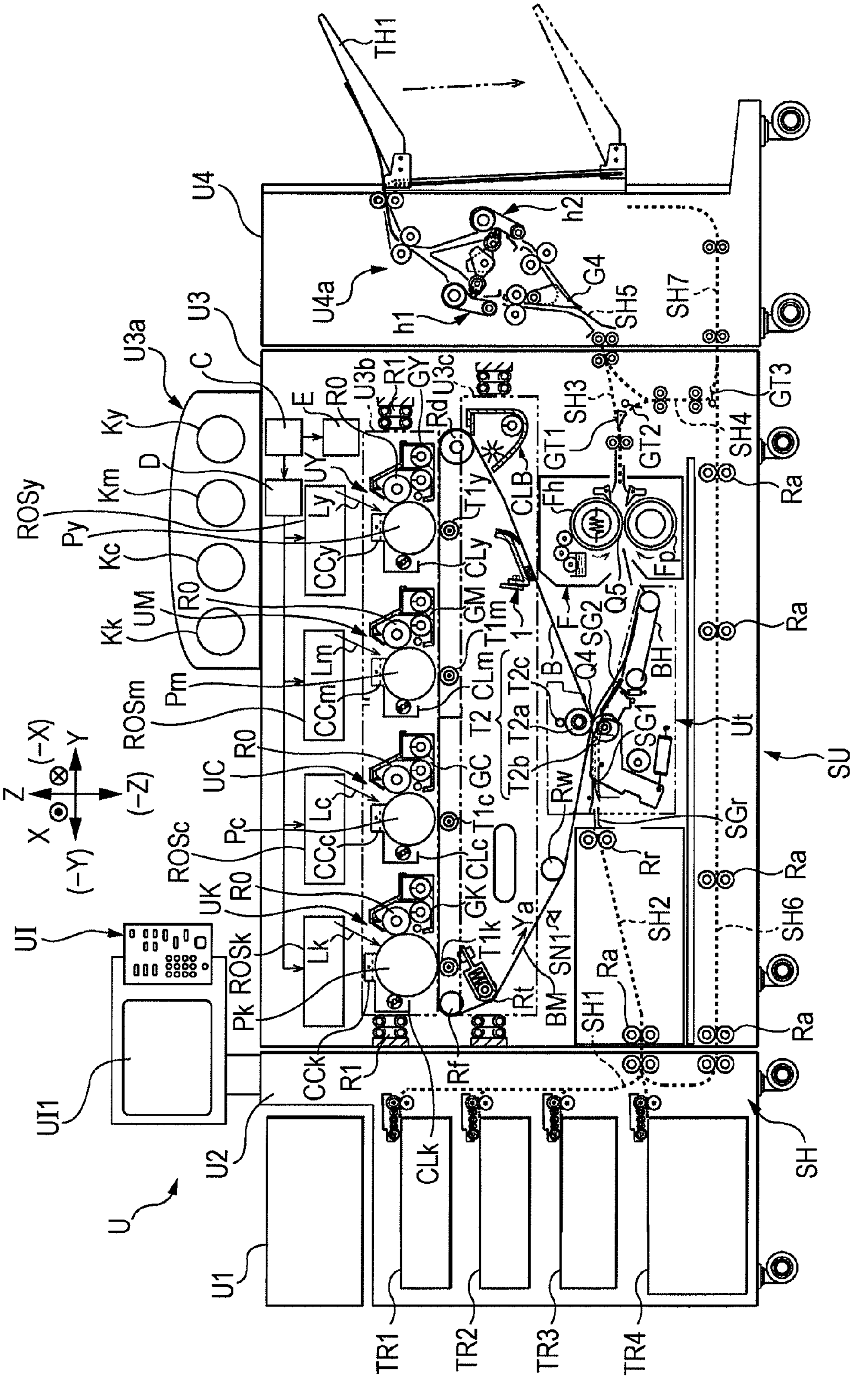
FIG. 1 illustrates an entire image forming apparatus according to a first exemplary embodiment of the present invention.

Next, although exemplary embodiments of the present invention will be described with reference to the drawings, the present invention is not limited to the following exemplary embodiments.

For the sake of easier understanding of the following description, in the drawings, forward-backward directions correspond to x axis directions, leftward-rightward directions correspond to y axis directions, and upward-downward directions correspond to z axis directions. Directions and sides represented by arrows X, −X, Y, −Y, Z, and −Z correspond to the forward direction, the backward direction, the rightward direction, the leftward direction, the upward direction, and the downward direction, respectively; or to the front side, the back side, the right side, the left side, the upper side, and the lower side, respectively.

In the drawings, a circle having a dot therein signifies an arrow extending from the back to the front of a sheet, and a circle having an x therein signifies an arrow extending from the front to the back of the sheet.

In the description using the drawings below, parts other than those required for easier understanding will not be illustrated accordingly.

First Exemplary Embodiment

FIG. 1 illustrates an entire image forming apparatus U according to a first exemplary embodiment of the present invention.

In FIG. 1, the image forming apparatus U includes a user interface UI serving as an exemplary operating unit, an image input device U1 serving as an exemplary image reading device, a sheet-feed device U2, an image recording device U3 serving as an exemplary body of the image forming apparatus and an exemplary removal member to be removed, and a sheet processing device U4.

The user interface UI includes a display UI1 and input keys, such as a copy start key and a numeric keypad, serving as exemplary input sections.

The image input device U1 includes, for example, an image scanner serving as an exemplary image reading device. In FIG. 1, in the image input device U1, an original (not shown) is read, the reading of the original is converted into image information, and the image information is input to the image recording device U3.

The sheet-feed device U2 includes, for example, sheet-feed trays TR1 to TR4 serving as exemplary sheet-feed sections, and a sheet-feed path SH1 through which sheets of recording paper S serving as exemplary media held in the sheet-feed trays TR1 to TR4 are transported.

In FIG. 1, the image recording device U3 includes, for example, an image recording section, a toner dispenser device U3*a* serving as an exemplary replenishing device, a sheet transport path SH2, a sheet transport path SH3, a sheet reversing path SH4, and a sheet circulation path SH6. The image recording section records images on the sheets of recording paper S that have been transported from the sheet-feed device U2. The image recording section will be described later.

The image recording device U3 further includes, for example, a controller C, a laser driving circuit D, and a power supply circuit E. The laser driving circuit D serves as an exemplary driving circuit of a latent-image forming device controlled by the controller C. The power supply circuit E is controlled by the controller C. In a preset timing, the laser driving circuit D whose operation is controlled by the controller C outputs to latent image forming devices ROSy, ROSm, ROSc, and ROSk laser driving signals corresponding to pieces of image information corresponding to yellow (Y), magenta (M), cyan (C), and black (K) input from the image input device U1.

A draw-out member U3*b* for image forming units is supported below the latent image forming devices ROSy, ROSm, ROSc, and ROSk by a pair of left and right guide members R1 and R1 so as to be movable between a draw-out position where the draw-out member U3*b* is drawn out forwardly of the image recording device U3 and a mounting position where the draw-out member U3*b* is mounted to the interior of the image recording device U3.

In FIG. 1, a black image holding member unit UK includes a photoconductor member Pk serving as an exemplary image holding member, a charging unit CCk serving as an exemplary discharger, and a photoconductor cleaner CLk serving as an exemplary cleaning unit for the image holding member. In the first exemplary embodiment, the charging unit CCk is capable of being mounted to and removed from the image recording device U3. Image holding member units of other colors Y, M, and C, that is, the image holding member units UY, UM, and UC include respective photoconductor members Py, Pm, and Pc, respective charging units CCy, CCm, and CCc serving as exemplary dischargers, and respective photoconductor cleaners CLy, CLm, and CLc. In the first exemplary embodiment, the diameter of the photoconductor member Pk for black (K), which is used often and whose surface friction is high, is larger than those of the photoconductor members Py, Pm, and Pc for the other colors. The photoconductor member Pk is capable of rotating at high velocities, and has a long life.

Developing devices Gy to Gk are disposed on the right of the respective image holding member units UY to UK. Each of the developing devices Gy to Gk includes a development container G1 and a developing roller R0. Each development container G1 contains developer in the interior thereof. Each developing roller R0 serves as an exemplary developer holding member that holds on its surface the developer in the corresponding development container G1 and that forms a latent image on the surface of the corresponding one of the photoconductor members Py to Pk. A pair of stirring members G2 and G3 are contained in the interior of each development container G1. The pairs of stirring members G2 and G3 circulate and transport the developer in the frontward-backward directions while stirring the developer contained in the developing containers G1 by rotating the pairs of stirring members G2 and G3.

The image holding member units UY, UM, UC, and UK and the respective developing devices Gy, Gm, Gc, and Gk including the respective development rollers R0 constitute toner image forming members UY+Gy, UM+Gm, UC+Gc, and UK+Gk. The image holding member units UY, UM, UC, and UK and the developing devices Gy, Gm, Gc, and Gk are removably mounted to the draw-out member U3*b* for the image forming units.

In FIG. 1, after charging the photoconductor members Py, Pm, Pc, and Pk using the charging units CCy, CCm, CCc, and CCk, electrostatic latent images are formed on the surfaces of the respective photoconductor members Py, Pm, Pc, and Pk using laser beams Ly, Lm, Lc, and Lk serving as exemplary latent image formation light beams that are output from the respective latent image forming devices ROSy, ROSm, ROSc, and ROSk. The developing devices Gy, Gm, Gc, and Gk develop the electrostatic latent images on the surfaces of the photoconductor members Py, Pm, Pc, and Pk into toner images of respective colors, yellow (Y), magenta (M), cyan (C), and black (K).

When the developer in the developing devices Gy to Gk is consumed as a result of the developing operations of the developing devices Gy to Gk, the toner dispenser device U3*a* (disposed at an upper portion of the image recording device U3) operates, so that developer is supplied from toner cartridges Ky, Km, Kc, and Kk (serving as exemplary developer containers) in accordance with respective toner consumption amounts.

First transfer rollers T1*y*, T1*m*, T1*c*, and T1*k* (serving as exemplary first transfer units) transfer the toner images on the surfaces of the respective photoconductor members Py, Pm, Pc, and Pk to an intermediate transfer belt B (serving as an intermediate transfer body serving as an exemplary image holding member) by successively superimposing the toner images upon each other. Therefore, an image of multiple colors, that is, what is called a color image is formed on the intermediate transfer belt B. The color image formed on the intermediate transfer belt B is transported to a second transfer area Q4 serving as an exemplary image recording position.

When only black image data is provided, the black (K) photoconductor member Pk and the black (K) developing device Gk are only used, to form only a black toner image.

In the image forming apparatus U according to the first exemplary embodiment, an image density sensor SN1 is disposed between the second transfer area Q4 and a black (K) first transfer area disposed at a downstreammost side in a direction of rotation of the intermediate transfer belt B serving as an exemplary endless belt-like member. The image density sensor SN1 serves as an exemplary density detecting member that is capable of detecting the density of an image held by the surface of the intermediate transfer belt B.

After the first transfer, any residual toner remaining on the surfaces of the respective photoconductor members Py, Pm, Pc, and Pk are cleaned off by the respective photoconductor cleaners CLy, CLm, CLc, and CLk.

A draw-out member U3*c* for the intermediate transfer body is supported below the draw-out member U3*b* for the image forming units so as to be movable between a draw-out position where the draw-out member U3*c* is drawn out forwardly of the image recording device U3 and a mounting position where the draw-out member U3*c* is mounted to the interior of the image recording device U3. A belt module BM serving as an exemplary intermediate transfer device serving as an exemplary removable unit is supported at the draw-out member U3*c* for the intermediate transfer body so as to be capable of being raised and lowered between a raised position and a lowered position. At the raised position, the belt module BM contacts the lower surfaces of the respective photoconductor members Py, Pm, Pc, and Pk. At the lowered position, the belt module BM is downwardly separated from the lower surfaces of the respective photoconductor members Py, Pm, Pc, and Pk.

The belt module BM includes the intermediate transfer belt B, belt supporting rollers Rd, Rt, Rw, Rf, and T2*a* serving as exemplary intermediate transfer body supporting members, and the first transfer rollers T1*y*, T1*m*, T1*c*, and T1*k*. The belt supporting rollers Rd, Rt, Rw, Rf, and T2*a* include the belt driving roller Rd serving as an exemplary driving member, the tension roller Rt serving as an exemplary tension applying member, the walking roller Rw serving as a meandering prevention member, the multiple idler rollers Rf serving as exemplary driven members, and the back-up roller T2*a* serving as an exemplary member opposing the second transfer area Q4. The intermediate transfer belt B is supported by the belt supporting rollers Rd, Rt, Rw, Rf, and T2*a* so as to be rotatable in the direction of arrow Ya.

When an image formation operation is executed, the belt module BM according to the first exemplary embodiment moves to the raised position, so that driving force is capable of being transmitted to the belt driving roller Rd. When the belt module BM is to be mounted or removed, or, for example, the image holding member units UY to UK are to be mounted or removed, the belt module BM moves to the lowered position. When, with the belt module BM being moved to the lowered position, the draw-out member U3*c* for the intermediate transfer body is drawn out forwardly, the belt module BM is mountable or removable with respect to the draw-out member U3*c* for the intermediate transfer body of the image recording device U3.

When, with the belt module BM being moved to the lowered position, the draw-out member U3*b* for the image forming units is drawn out forwardly, the image holding member units UY to UK and the developing devices Gy to Gk are mountable or removable with respect to the image recording device U3.

A second transfer unit Ut is disposed below the back-up roller T2*a*. The second transfer unit Ut includes a second transfer roller T2*b* serving as an exemplary second transfer member. The second transfer roller T2*b* is disposed so as to be capable of separating from and contacting the back-up roller T2*a* with the intermediate transfer belt B being disposed therebetween. The second transfer area Q4 is formed by an area where the second transfer roller T2*b* contacts the intermediate transfer belt B. A contact roller T2*c* serving as an exemplary contact member for applying voltage contacts the back-up roller T2*a*. A second transfer section T2 is formed by the rollers T2*a* to T2*c*.

A power supply circuit that is controlled by the controller C applies to the contact roller T2*c* a second transfer voltage whose polarity is the same as a charging polarity of toner at a preset timing.

The sheet transport path SH2 is disposed below the belt module BM. Sheets of recording paper S that have been fed from the sheet-feed path SH1 of the sheet-feed device U2 are transported to the sheet transport path SH2. Then, by registration rollers Rr serving as exemplary members for adjusting sheet-feed timing, the sheets of recording paper S are transported to the second transfer area Q4 through medium guide members SGr and SG1 (used before second transfer) in accordance with a timing in which the toner images are transported to the second transfer area Q4.

The toner images on the intermediate transfer belt B are transferred to the recording paper S by the second transfer section T2 when the toner images pass through the second transfer area Q4. For a full-color image, the toner images that are superimposed upon each other on the surface of the intermediate transfer belt B and transferred thereto by first transfer operations are all together transferred to the recording paper S by second transfer operations.

The intermediate transfer belt B after the second transfer operations is cleaned by a belt cleaner CLB serving as an exemplary cleaner for the intermediate transfer body.

The first transfer rollers T1*y*, T1*m*, T1*c*, and T1*k*, the intermediate transfer belt B, the second transfer section T2, the belt cleaner CLB, etc. constitute a transfer device T1+B+T2+CLB that transfers the images on the surfaces of the photoconductor members Py to Pk to the recording paper S.

The recording paper S to which the toner images are transferred by the second transfer operations is transported to a fixing device F through a medium guide member SG2 (used before the second transfer) and a sheet transporting belt BH serving as an exemplary medium transporting member used before the fixing. The fixing device F includes a heating roller Fh, serving as a heating fixing member, and a pressure roller Fp, serving as a pressure fixing member. A fixing area Q5 is formed by an area where the heating roller Fh and the pressure roller Fp contact each other.

The toner images on the recording paper S are fixed thereto by heat by the fixing device F when the toner images pass through the fixing area Q5.

By the toner image forming members UY+Gy, UM+Gm, UC+Gc, and UK+Gk, the transfer device T1+B+T2+CLB, the fixing device, etc., the image recording section according to the first exemplary embodiment that records images on recording paper S is formed.

A first gate GT1 serving as a switching member for switching between transport paths is provided downstream from the fixing device F. The first gate GT1 switches the transport path of the recording paper S that has been transported through the sheet transport path SH2 and that has been subjected to heating and fixing at the fixing area Q5 between the sheet discharge path SH3 and the sheet reversing path SH4 of the image recording device U3. The sheet S that has been transported through the sheet discharge path SH3 is transported to the sheet transport path SH5 of the sheet processing device U4.

A decurling device U4*a* serving as a straightening device is disposed in the sheet transport path SH5. A second gate G4 serving as an exemplary switching member for switching between transport paths is disposed in the sheet transport path SH5. The second gate G4 transports the recording paper S that has been transported from the sheet transport path SH3 of the image recording device U3 to either a first decurling member h1 or a second decurling member h2 in accordance with a curve, that is, a curling direction. The recording paper S that has been transported to the first decurling member h1 or the second decurling member h2 decurls the recording paper S when the recording paper S passes either the first decurling member h1 or the second decurling member h2. The decurled recording paper S is discharged from discharge rollers Rh serving as exemplary discharge members to a discharge tray TH1 with an image fixing surface of the recording paper S facing upward (that is, with the recording paper S being in a faced-up state). The discharge tray TH1 serves as an exemplary discharge section of the sheet processing device U4.

The recording paper S that has been transported towards the sheet reversing path SH4 of the image recording device U3 by the first gate GT1 passes a regulating member, that is, a Mylar gate GT2 by pushing away the Mylar gate GT2, and is transported to the sheet reversing path SH4 of the image recording device U3. The regulating member is formed of a thin elastic film and extends in a transportation direction.

The sheet circulation path SH6 and a sheet reversing path SH7 are connected to a downstream end of the sheet reversing path SH4 of the image recording device U3. A Myler gate GT3 is also disposed at a connection portion of the sheet circulation path SH6 and the sheet reversing path SH7 with the downstream end of the sheet reversing path SH4. The sheet that has been transported to the sheet transport path SH4 through the first gate GT1 passes the Myler gate GT3, and is transported to the sheet reversing path SH7 of the sheet processing device U4. For performing duplex printing, the recording paper S that has been transported through the sheet reversing path SH4 passes the Myler gate GT3, and is transported to the sheet reversing path SH7. Thereafter, when the recording paper S is transported in the opposite direction, that is, is redirected, the direction of transportation thereof is regulated by the Myler gate GT3, and the redirected recording paper S is transported towards the sheet circulation path SH6. The recording paper S that has been transported through the sheet circulation path SH6 passes through the sheet-feed path SH1, and is transported again to the second transfer area Q4.

When the recording paper S that is transported to the sheet reversing path SH4 is redirected before a rear end of the recording paper S passes the Myler gate GT3 after passing the Myler gate GT2, the direction of transportation of the recording paper S is regulated by the Myler gate GT2, and the recording paper S is transported to the sheet transport path SH5 with its front and back reversed. After the recording paper S whose front and back have been reversed is decurled by the decurling device U4*a*, it is possible to discharge the recording paper S with an image fixing surface facing downward (that is, with the recording paper S in a faced-down state) to the sheet discharge tray TH1 of the sheet processing device U4.

The sheet transport path SH includes the paths indicated by the symbols SH1 to SH7. A sheet transporting device SU includes the elements indicated by the symbols SH, Ra, Rr, Rh, SGr, SG1, SG2, BH, and GT1 to GT3.

Description of Belt Inner-Surface Cleaner

Figure 2A:
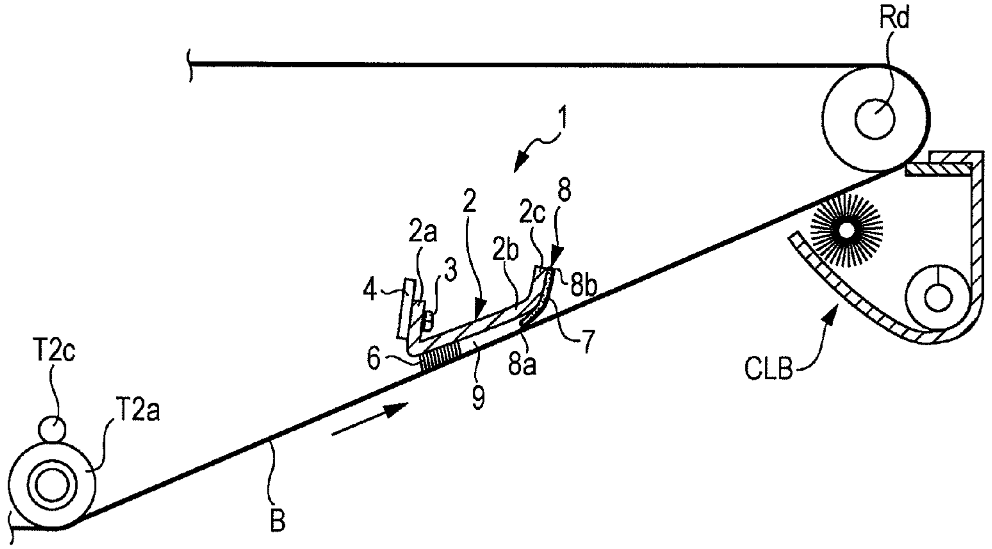
FIGS. 2A to 2C illustrate a belt inner-surface cleaner according to the first exemplary embodiment of the present invention, with FIG. 2A being an entire view thereof, FIG. 2B illustrating a principal portion of the belt inner-surface cleaner during rotation of a belt, and FIG. 2C illustrating the principal portion of the belt inner-surface cleaner when the rotation of the belt is stopped.
Figure 2B:
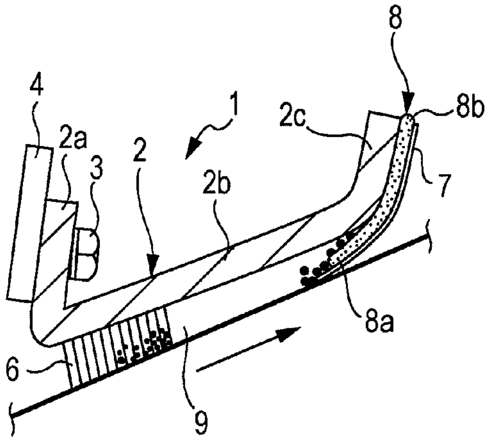
Figure 2C:
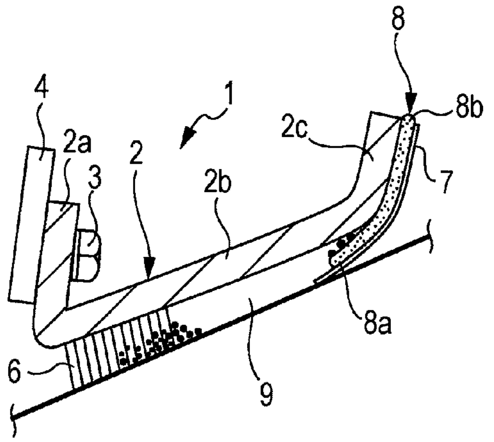

FIGS. 2A to 2C illustrate a belt inner-surface cleaner 1 according to the first exemplary embodiment of the present invention, with FIG. 2A being an entire view thereof, FIG. 2B illustrating a principal portion of the belt inner-surface cleaner 1 during rotation of the belt, and FIG. 2C illustrating the principal portion of the belt inner-surface cleaner 1 when the rotation of the belt is stopped.

In FIGS. 1 to 2C, in the image forming apparatus U, the belt inner-surface cleaner 1 serving as an exemplary cleaner that cleans the inner surface of the belt-like member is disposed between the back-up roller T2*a* and the driving roller Rd in accordance with the inner surface of the intermediate transfer belt B. The back-up roller T2*a* serves as an exemplary first contact member. The driving roller Rd serves as an exemplary second contact member disposed downstream from the back-up roller T2*a* and upwardly of the back-up roller T2*a* in a direction of gravitational force.

The belt inner-surface cleaner 1 according to the first exemplary embodiment includes a holder 2 serving as an exemplary cleaning supporting member. In the holder 2, a left-end support portion 2*a* is supported at a frame 4 with a bolt 3. The bolt 3 is an exemplary fastening member. The frame 4 is an exemplary frame of the belt module BM. The holder 2 includes a first supporting portion 2*b* and a second supporting portion 2*c*. The first supporting portion 2*b* extends obliquely upward from a lower end portion of the support portion 2*a* along the inner surface of the intermediate transfer belt B. The second supporting portion 2*c* extends upward from an upper end of the first supporting portion 2*b*.

A cleaning brush 6, serving as an exemplary first cleaning member, is supported at a lower surface of the lower end portion of the first supporting portion 2*b*. The cleaning brush 6 according to the first exemplary embodiment has hairs that contact the inner surface of the intermediate transfer belt B. The hairs are formed of insulating material. Therefore, the cleaning brush 6 is formed so that, when it contacts the inner surface of the intermediate transfer belt B and friction is generated, it undergoes frictional electrification. The cleaning brush 6 according to the first exemplary embodiment is capable of removing adherents having relatively small particle sizes, such as toner, that float in the interior of the image forming apparatus U and that adhere to the inner surface of the intermediate transfer belt B, by electrostatically attracting and physically scraping off by friction the adherents. For the hairs of the cleaning brush 6, a material that is charged to a polarity that is opposite to that of the toner, that is, to a polarity that attracts the toner during frictional electrification is selected in accordance with a triboelectric series with respect to the intermediate transfer belt B.

A cleaning film 7, serving as a second cleaning member, is supported by a surface of the second supporting portion 2*c* facing the intermediate transfer belt B. The cleaning film 7 according to the first exemplary embodiment is formed of a resinous material formed into a thin film. As an example of the thin film, a thin film formed of polyethylene terephthalate (PET) may be used. A base end portion of the cleaning film 7 is secured to the second supporting portion 2*c* using a double-sided tape 8 serving as an adhesive material. An end of the cleaning film 7 is disposed so as to extend upstream in the direction of rotation of the intermediate transfer belt B, that is, so as to extend in a counter direction. The end of the cleaning film 7 undergoes elastic deformation and is flexed, so that the end of the cleaning film 7 contacts the inner surface of the intermediate transfer belt 8 while a pre-set contact pressure acts thereupon. Therefore, the cleaning film 7 according to the first exemplary embodiment is capable of physically scraping off by friction and of removing an adherent on the inner surface of the intermediate transfer belt B that has passed through the cleaning brush 6. The cleaning film 7 according to the first exemplary embodiment removes and cleans off adherents in such a manner that is similar to collecting of dust by a dust collector. Compared to the cleaning brush 6, the cleaning film 7 is capable of collecting adherents that have large particle sizes or that are heavy, and its cleaning capability for removing and cleaning off the adherents is set high.

In FIGS. 2A to 2C, the cleaning brush 6 and the cleaning film 7 are disposed apart from each other by a pre-set distance. An accommodation space 9 that accommodates material collected by the cleaning film 7 is formed between the cleaning brush 6 and the cleaning film 7.

The double-sided tape 8 includes an adhesive portion 8*a* and an adhering portion 8*b*. The adhesive portion 8*a* is disposed adjacent to the end of the cleaning film 7 with an adhesive being exposed to an inner portion of the accommodation space 9. The adhering portion 8*b* allows the second supporting portion 2*c* and the base end portion of the cleaning film 7 to adhere to each other.

Operation in First Exemplary Embodiment

In the image forming apparatus U according to the first exemplary embodiment of the present invention having the above-described structure, the belt inner-surface cleaner 1 that cleans the inner surface of the intermediate transfer belt B is disposed between the back-up roller T2*a* and the driving roller Rd. The inner surface of the intermediate transfer belt B may become stained as a result of particles having a small particle size, such as floating developer or corona products, adhering to the inner surface of the intermediate transfer belt B. When the adhered floating developer is left on the inner surface of the intermediate transfer belt B, the developer adheres to, for example, the rollers T2*a* and Rd, as a result of which slipping occurs between the intermediate transfer belt B and each of the rollers T2*a* and Rd. Therefore, for example, the rotation of the intermediate transfer belt B becomes unstable. As discussed in, for example, Japanese Unexamined Patent Application Publication No. 2-26232 (line 13, right column, page 1 to line 21, left column, page 2; FIGS. 1 to 3) and Japanese Patent No. 4240453 (paragraphs 0036 to 0051; FIGS. 2 to 4), a member that cleans the inner surface of the intermediate transfer belt B has been hitherto disposed.

In the structure that supports a belt, such as the intermediate transfer belt B, for example, the rollers T2*a* and Rd that support the belt may be assembled, maintained, inspected, and disassembled. In this case, when a screw or a bolt is tightened or loosened, for example, foreign matter scraped off from the screw or a threaded hole may be produced. When, for example, a member is mounted or removed, foreign matter that is larger than, for example, toner may fall onto and adhere to the inner surface of the intermediate transfer belt B by, for example, shock or vibration.

Such foreign matter is larger and heavier than, for example, the toner. Related structures, such as a brush for removing foreign matter (such as toner) that has a small particle size and that is light, are not capable of completely removing such large foreign matter. Therefore, such large foreign matter may pass, for example, the brush. Such foreign matter that has passed the brush, adheres to the inner surface of the belt, is transported downstream, and is interposed between the belt and a downstream-side roller. As a result, the belt becomes uneven, thereby causing damage to the belt or improper transportation of the belt. In addition, contact between the belt and a cleaning blade of the belt cleaner CLB becomes ununiform due to the unevenness of the belt in a widthwise direction thereof, thereby resulting in cleaning failure of the belt.

In the structure discussed in Japanese Patent No. 4240453, etc., even if foreign matter is removed from the inner surface of the belt, when the belt is stopped, the foreign matter may fall along the belt and enter a portion between the belt and a lower roller due to gravitational force acting upon large foreign matter. If the foreign matter adheres to the lower roller, the roller rotates with the foreign matter adhered thereto during a next rotation. Then, the foreign matter enters the portion between the roller and the belt from the upstream side. This may result in, for example, damage to the belt.

Therefore, in the related structure, when, for example, a cleaning failure occurs due to foreign matter that is incapable of being collected by the inner-surface cleaner (such as scraped off foreign matter), a service engineer removes and cleans off the foreign matter by disassembling the interior of the related structure. This is costly and is troublesome to perform.

In contrast, in the belt inner-surface cleaner 1 according to the first exemplary embodiment, as shown in FIG. 2B, the cleaning brush 6 (disposed at the upstream side) collects, for example, toner that is relatively light and small as in the related art, and the cleaning film 7 (disposed at the downstream side) removes and collects foreign matter that has passed through the cleaning brush 6. Then, when the rotation of the intermediate transfer belt B is stopped, as shown in FIG. 2C, even if large and heavy foreign matter collected by the cleaning film 7 tries to fall along the intermediate transfer belt B due to gravitational force, the foreign matter is stopped by the cleaning brush 6 that is in contact with the intermediate transfer belt B, so that the foreign matter is trapped in the accommodation space 9. That is, when the intermediate transfer belt B is rotates, the large foreign matter passes through the cleaning brush 6 due transportation force of the intermediate transfer belt B and adhesive force between the intermediate transfer belt B and the large foreign matter. However, when, after the large foreign matter is separated from the intermediate transfer belt B by the cleaning film 7, the intermediate transfer belt B is stopped, the large foreign matter falls along the belt due to gravitational force, but is not capable of passing through the cleaning brush 6, so that it is stopped by the cleaning brush 6.

Therefore, in the belt inner-surface cleaner 1 according to the first exemplary embodiment, the foreign matter that has been collected by the cleaning film 7 is retained in a trapped state in the accommodation space 9, so that the downward movement of the foreign matter along the intermediate transfer belt B is reduced.

In the belt inner-surface cleaner 1 according to the first exemplary embodiment, the adhesive portion 8*a* of the double-sided tape is disposed so as to be exposed to the accommodation space 9, and is capable of collecting foreign matter collected in the accommodation space 9 when the foreign matter is attracted to the adhesive portion 8*a* using an adhesive. Therefore, compared to a case in which the adhesive portion 8*a* is not exposed, it becomes easier to trap the foreign matter in the accommodation space 9.

Further, in the belt inner-surface cleaner 1 according to the first exemplary embodiment, the adhesive portion 8*a* that causes foreign matter to be trapped is provided at the double-sided tape 8 that allows the cleaning film 7 to adhere to the holder 2. Compared to a structure in which the adhesive portion 8*a* is provided separately from a material that secures the cleaning film 7, the structure is simpler, and costs are reduced.

In addition, in the belt inner-surface cleaner 1 according to the first exemplary embodiment, two cleaning members 6 and 7 are supported by one holder 2. Therefore, compared to a case in which separate holders are provided, the structure is simplified, and costs are reduced.

Further, in the belt inner-surface cleaner 1 according to the first exemplary embodiment, the hairs of the cleaning brush 6 are capable of collecting toner by attracting the toner as a result of undergoing frictional electrification. Compared to a case in which the hairs of the cleaning brush 6 do not undergo frictional electrification, collecting capability is increased.

Second Exemplary Embodiment

Figure 3A:
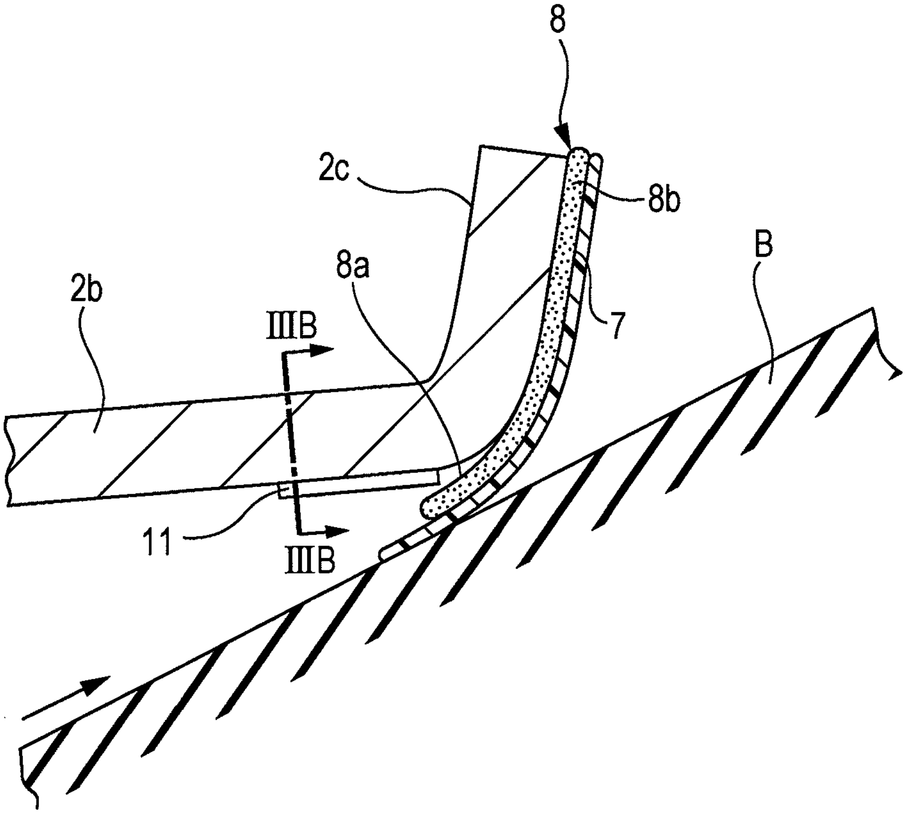
FIGS. 3A and 3B illustrate a belt inner-surface cleaner according to a second exemplary embodiment of the present invention, with FIG. 3A corresponding to FIGS. 2A to 2C illustrating the first exemplary embodiment and FIG. 3B being a sectional view taken along line IIIB-IIIB shown in FIG. 3A.
Figure 3B:
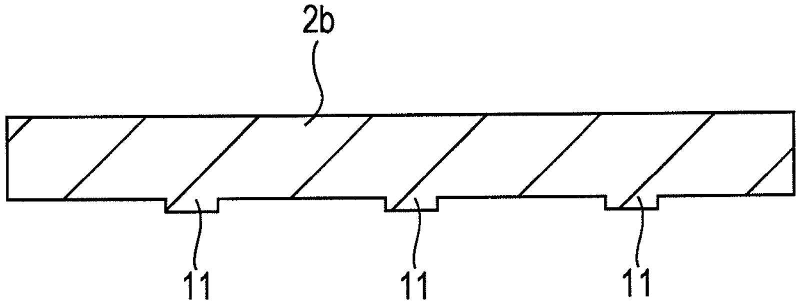
Figure 4:
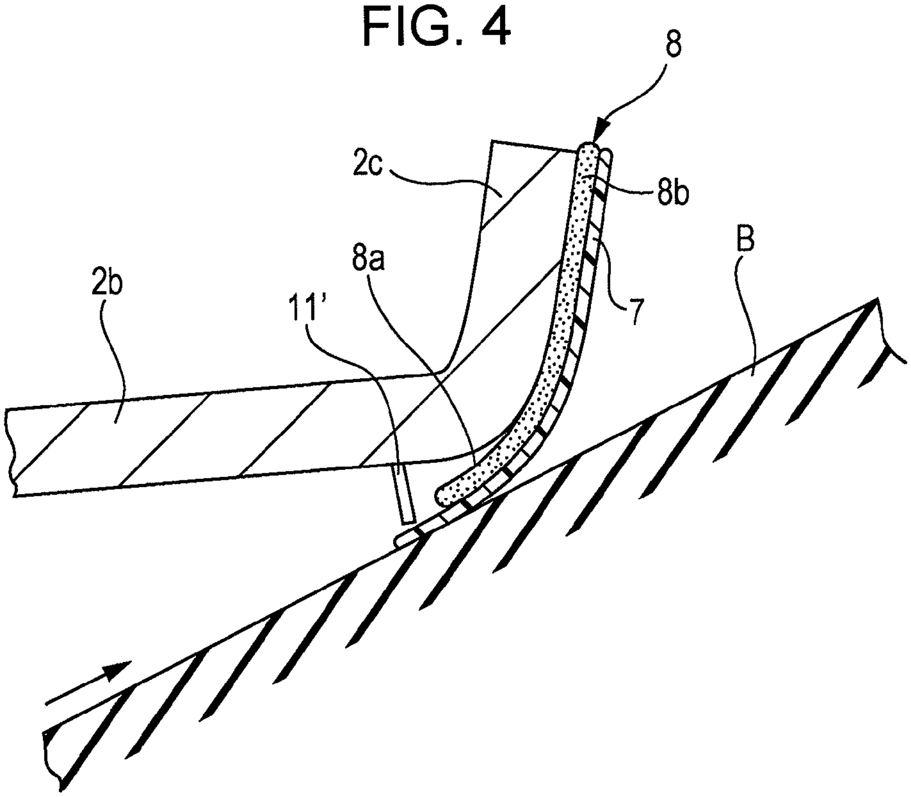
FIG. 4 illustrates a belt inner-surface cleaner according to a third exemplary embodiment of the present invention, and corresponds to FIG. 3A illustrating the second exemplary embodiment.

FIGS. 3A and 3B illustrate a belt inner-surface cleaner 1 according to a second exemplary embodiment of the present invention, with FIG. 3A corresponding to FIGS. 2A to 2C illustrating the first exemplary embodiment and FIG. 3B being a sectional view taken along line IIIB-IIIB shown in FIG. 3A.

In the description of the second exemplary embodiment, structural elements corresponding to the structural elements according to the first exemplary embodiment are given the same reference numerals, and will not be described in detail.

The structure according to the second exemplary embodiment differs from the structure according to the first exemplary embodiment in the following points, but is similar to the structure according to the first exemplary embodiment in the other points.

In FIGS. 3A and 3B, in the belt inner-surface cleaner 1 according to the second exemplary embodiment, ribs 11, serving as exemplary protrusions, are formed at an upper end portion of a first supporting portion 2*b*. The ribs 11 protrude towards an intermediate transfer belt B, extend along a direction of movement of the belt, and are disposed apart from each other by a pre-set distance in a widthwise direction of the intermediate transfer belt B.

Operation in Second Exemplary Embodiment

In the belt inner-surface cleaner 1 according to the second exemplary embodiment having the above-described structure, the ribs 11 are disposed. Therefore, compared to a case in which ribs are not disposed, the area of a portion where the first supporting portion 2*b* and an adhesive portion 8*a* are capable of contacting each other is reduced.

If a cleaning film 7 adheres to the second supporting portion 2*c* when the belt inner-surface cleaner 1 is assembled, the adhesive portion 8*a* may accidentally contact and adhere to the first supporting portion 2*b*. In contrast, if the area of the portion where the first supporting portion 2*b* and the adhesive portion 8*a* are capable of contacting each other is reduced by forming the ribs 11 as in the second exemplary embodiment, the adhesive portion 8*a* does not easily adhere to the ribs 11 even if the adhesive portion 8*a* accidentally contacts the ribs 11. Even if the adhesive portion 8*a* accidentally adheres to the ribs 11, the adhesive portion 8*a* is easily separated. Therefore, it is easier to return the accidentally adhered member to its previous state. Consequently, it is possible to reduce the frequency of assembly failure of the belt inner-surface cleaner 1 such as the cleaning film 7 not contacting the intermediate transfer belt B and the adhesive portion 8*a* not being exposed to the accommodation space 9.

In particular, in the belt inner-surface cleaner 1 according to the second exemplary embodiment, the cleaning film 7 is disposed so that a thin-film plate is flexed. By the flexing, an elastic restoring force acting in a direction in which an end of the cleaning film 7 moves towards the intermediate transfer belt B acts upon the cleaning film 7. Therefore, when the contact area is small and the entire adhesive force is less than the elastic restoring force, even if the adhesive portion 8*a* accidentally contacts the ribs 11, the adhesive portion 8*a* automatically separates from the ribs 11 due to the elastic restoring force of the cleaning film 7, and is automatically restored to its previous state.

Third Exemplary Embodiment

FIG. 4 illustrates a belt inner-surface cleaner 1 according to a third exemplary embodiment of the present invention, and corresponds to FIG. 3A illustrating the second exemplary embodiment.

In the description of the third exemplary embodiment, structural elements corresponding to the structural elements according to the first and second exemplary embodiments are given the same reference numerals, and will not be described in detail.

The structure according to the third exemplary embodiment differs from the structures according to the first and second exemplary embodiment in the following points, but is similar to the structures according to the first and second exemplary embodiment in the other points.

In FIG. 4, in the belt inner-surface cleaner 1 according to the third exemplary embodiment, in place of the ribs 11 according to the second exemplary embodiment extending in the direction of movement of the belt, comb-like ribs 11' are formed at an end portion of a cleaning film 7 where an adhesive portion 8*a* is not provided.

Operation of Third Exemplary Embodiment

In the belt inner-surface cleaner 1 according to the third exemplary embodiment having the above-described structure, even if the adhesive portion 8*a* tries to adhere to a first supporting portion 2*b*, first, the ribs 11' and the cleaning film 7 contact each other, so that the frequency with which the adhesive portion 8*a* adheres to the first supporting portion 2*b* is reduced. Therefore, it is possible to reduce the frequency with which assembly failure of the belt inner-surface cleaner 1 occurs.

Fourth Exemplary Embodiment

Figure 5:
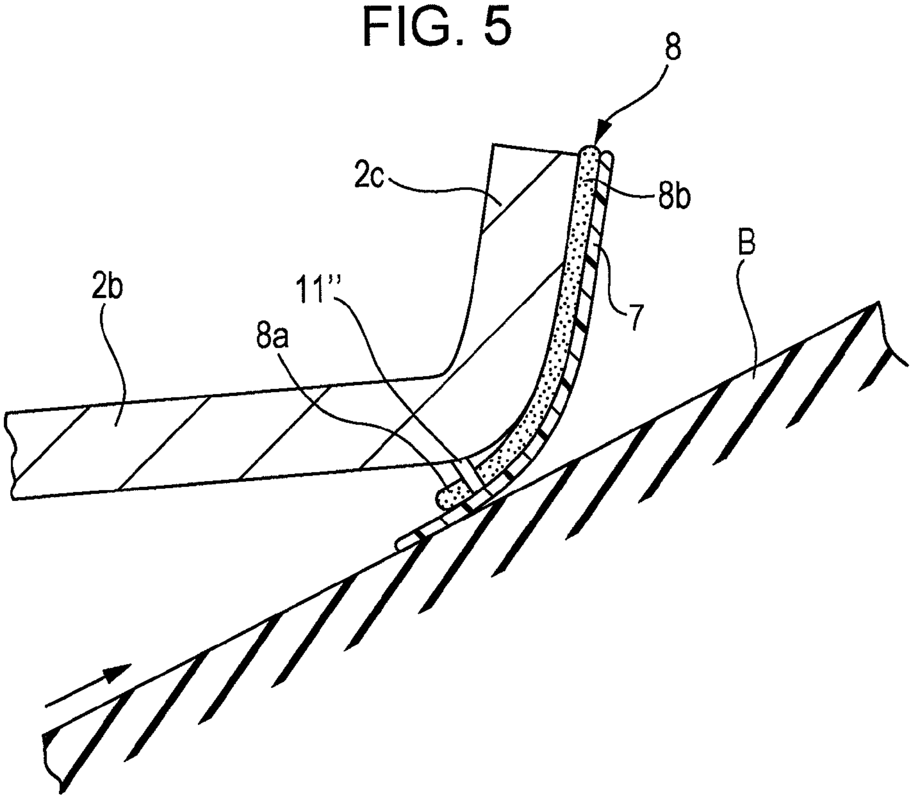
FIG. 5 illustrates a belt inner-surface cleaner according to a fourth exemplary embodiment of the present invention, and corresponds to FIG. 3A illustrating the second exemplary embodiment.

FIG. 5 illustrates a belt inner-surface cleaner 1 according to a fourth exemplary embodiment of the present invention, and corresponds to FIG. 3A illustrating the second exemplary embodiment.

In the description of the fourth exemplary embodiment, structural elements corresponding to the structural elements according to the first to third exemplary embodiments are given the same reference numerals, and will not be described in detail.

The structure according to the fourth exemplary embodiment differs from the structures according to the first to third exemplary embodiments in the following points, but is similar to the structures according to the first exemplary embodiment in the other points.

In FIG. 5, in the belt inner-surface cleaner 1 according to the fourth exemplary embodiment, in place of the ribs 11 according to the second exemplary embodiment extending in the direction of movement of the belt, ribs 11", serving as exemplary protrusions, extending along a widthwise direction of the belt is provided at an upper surface of a cleaning film 7. The ribs 11" according to the fourth exemplary embodiment are supported with linear resin being adhered to the upper surface of the cleaning film 7. An adhesive portion 8*a* is provided at an end side of the cleaning film 7 with respect to the ribs 11".

Operation in Fourth Exemplary Embodiment

In the belt inner-surface cleaner 1 according to the fourth exemplary embodiment having the above-described structure, even if the adhesive portion 8*a* tries to adhere to the first supporting portion 2*b* when the cleaning film 7 is assembled, first, the ribs 11" and the cleaning film 7 contact each other, so that the frequency with which the adhesive portion 8*a* adheres to the first supporting portion 2*b* is reduced as in the third exemplary embodiment. Therefore, it is possible to reduce the frequency with which assembly failure of the belt inner-surface cleaner 1 occurs.

MODIFICATIONS

Although the exemplary embodiments according to the present invention are described in detail above, the present invention is not limited to the above-described exemplary embodiments. Various modifications can be made within the scope of the gist of the present invention as set forth within the scope of the claims. Modifications (H01) to (H011) according to the present invention are given below.

(H01) Although, in each of the exemplary embodiments, a copying machine is used as an exemplary image forming apparatus, the present invention is applicable to other image forming apparatuses such as a printer and a facsimile machine. In addition, the present invention is not limited in its application to a color image forming apparatus. The present invention is also applicable to a monochromatic image forming apparatus. Further, the present invention is not limited in its application to a tandem image forming apparatus. The present invention is also applicable to a rotary image forming apparatus.

(H02) Although, in each of the exemplary embodiments, the belt inner-surface cleaner 1 is applied to the intermediate transfer belt B serving as an endless belt-like member, the application of the belt inner-surface cleaner 1 is not limited to the intermediate transfer belt B. The belt inner-surface cleaner 1 is applicable to other belt-like members, such as a photoconductor belt (serving as an exemplary belt-like photoconductor member), a sheet transport belt (serving as an exemplary belt-like member that transports a medium), and a transfer transporting belt that is disposed in a transfer area and that holds and transports a medium on its surface.

(H03) Although, in each of the exemplary embodiments, the cleaning brush 6 having hairs is used as an exemplary first cleaning member, the present invention is not limited thereto. Any other cleaning member, such as a woven cloth, a non-woven cloth, or porous material (what is called a sponge), that is capable of collecting, for example, toner may be used. In addition, the present invention is not limited to a fixed structure as exemplified in each of the exemplary embodiments. For example, a rotating brush that is driven and rotated by the rotation of the intermediate transfer belt B may also be used. Further, although it is desirable to use hairs that undergo frictional electrification, the present invention is not limited thereto. For example, electrically conductive hairs that do not easily undergo frictional electrification, a structure that is connected to ground, or a structure that applies voltage for electrostatically attracting foreign matter may also be used.

(H04) Although, in each of the exemplary embodiments, a thin-film resin material is used as an exemplary second cleaning member, the present invention is not limited thereto. For example, a cleaning blade serving as an exemplary cleaning member formed of a rubber material plate, a plate-like blade formed of metal, or a scraper may also be used as the cleaning member.

(H05) Although, in each of the exemplary embodiments, a double-sided tape 8 is used as an exemplary adhesive material, any other structure, including, for example, glue or gel, that is capable of attracting foreign matter may also be used. Although, it is desirable to expose the adhesive material in the accommodation space 9, it is also possible to use a structure that does not include an adhesive material, or a structure in which the adhesive portion 8*a* is not exposed to the accommodation space 9. Although the material that allows foreign matter in the accommodation space 9 to adhere thereto and the material that allows the cleaning film 7 to adhere to the second supporting portion 2*c* are exemplified as being the same material, the present invention is not limited thereto. These materials may be different materials.

(H06) Although, in each of the exemplary embodiments, it is desirable to support the two cleaning members 6 and 7 using one holder 2, it is possible to provide dedicated holders for the respective cleaning members 6 and 7.

(H07) Although, in each of the exemplary embodiments, a structure in which two cleaning members, that is, the cleaning members 6 and 7, are used, is exemplified, any number of cleaning members may be used as long as the number of cleaning members is at least two. Three or more cleaning members, such as a third cleaning member and a fourth cleaning member, may be added to the two cleaning members.

(H08) Although, in each of the exemplary embodiments, the length of the cleaning brush 6, serving as an exemplary first cleaning member, and the length of the cleaning film 7, serving as an exemplary second cleaning member, in the widthwise direction of the belt are arbitrarily settable in accordance with a required cleaning range, the present invention is not limited thereto. It is desirable for the length of the cleaning brush 6 at the upstream side in the widthwise direction of the belt to be longer than the length of the cleaning film 7 at the downstream side in the widthwise direction of the belt because it becomes easier to stop an adherent, so that it is possible to further reduce the movement of the cleaned off adherent.

(H09) Although, in each of the exemplary embodiments, the belt module, serving as an exemplary removable unit, is exemplified as being mounted to and removed from the front of the image recording device U3, the present invention is not limited thereto. The belt module may be mounted to or removed from the image recording device U3 in any other direction, that is, mounted to or removed from the left or right (side surfaces), the back (back side), or the top (upper side). Alternatively, the belt module may be mounted or removed obliquely.

(H010) Although, in each of the exemplary embodiments, the belt driving roller Rd and the back-up roller T2*a* serve as exemplary contact members, the contact members are not limited to members that rotatably support the intermediate transfer belt B. For example, rod-like members or plate members that contact the belt to generate tension or that contact and separate from the belt for changing the orientation or stretched state of the belt may be used.

(H011) Although, in each of the exemplary embodiments, an exemplary structure in which driving force is transmitted to the belt driving roller Rd, which directly supports the intermediate transfer belt B, by contacting the belt driving roller Rd with the inner surface of the intermediate transfer belt B is used, the present invention is not limited thereto. It is possible to use any other structure that rotates the belt serving as an exemplary belt-like member. For example, it is possible to use a structure in which the intermediate transfer belt B is rotated by, for example, a driving roller or a photoconductor member that contacts the outer surface of the intermediate transfer belt B. Alternatively, it is possible to use a structure that rotates the intermediate transfer belt B through a supporting roller by contacting the belt driving roller with the supporting roller that supports the intermediate transfer belt. In this structure, the belt driving roller does not directly support the intermediate transfer belt. In this case, although the belt driving roller is capable of supporting the belt module BM, it is possible to provide the belt driving roller at the image recording device U3 such that, even if the belt module BM is mounted or removed, the belt driving roller remains in the image recording device U3. The number of members that rotate the belt is not limited to one, so that a multiple number of such members may be disposed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A removable unit that is mountable to and removable from a body of an image forming apparatus, the removable unit comprising:

an endless belt-like member that rotates when driving force is transmitted thereto from the body of the image forming apparatus;

a first contact member that contacts an inner surface of the belt-like member;

a second contact member disposed at a downstream side in a direction of rotation of the belt-like member, the second contact member being disposed upwardly of the first contact member in a direction of gravitational force when the removable unit is mounted to the body of the image forming apparatus, the second contact member contacting the inner surface of the belt-like member;

a first cleaning member disposed between the first contact member and the second contact member, the first cleaning member contacting an inner peripheral surface of the belt-like member to clean off an adherent on the inner peripheral surface of the belt-like member; and a second cleaning member disposed between the first cleaning member and the second contact member, the second cleaning member contacting the inner peripheral surface of the belt-like member to clean the inner peripheral surface of the belt-like member, the second cleaning member cleaning off an adherent that has stuck on the inner peripheral surface of the belt-like member and that has passed the first cleaning member, wherein the first cleaning member prevents the adherent cleaned off by the second cleaning member from moving downward in the direction of gravitational force along the inner peripheral surface of the belt-like member.

2. An image forming apparatus comprising:

an endless belt-like member;

a first contact member that contacts an inner surface of the belt-like member;

a second contact member disposed at a downstream side in a direction of rotation of the belt-like member, the second contact member being disposed upwardly of the first contact member in a direction of gravitational force, the second contact member contacting the inner surface of the belt-like member;

a first cleaning member disposed between the first contact member and the second contact member, the first cleaning member contacting an inner peripheral surface of the belt-like member to clean off an adherent on the inner peripheral surface of the belt-like member; and a second cleaning member disposed between the first cleaning member and the second contact member, the second cleaning member contacting the inner peripheral surface of the belt-like member to clean the inner peripheral surface of the belt-like member, the second cleaning member cleaning off an adherent that has stuck on the inner peripheral surface of the belt-like member and that has passed the first cleaning member, wherein the first cleaning member prevents the adherent cleaned off by the second cleaning member from moving downward in the direction of gravitational force along the inner peripheral surface of the belt-like member.

3. The image forming apparatus according to claim 2, further comprising an adhesive material provided between the first cleaning member and the second cleaning member, the adherent cleaned off by the second cleaning member adhering to and being held by the adhesive material.

4. The image forming apparatus according to claim 3, wherein the adhesive material has an adhesive portion that allows the second cleaning member to adhere to a cleaning supporting member.

5. The image forming apparatus according to claim 2, wherein the first cleaning member is a brush having a plurality of hairs that contact the inner surface of the belt-like member, and wherein the second cleaning member is formed of an elastic plate, the second cleaning member extending upstream in a direction of movement of the inner surface of the belt-like member, an end of the second cleaning member contacting the inner surface of the belt-like member.

6. The image forming apparatus according to claim 3, wherein the first cleaning member is a brush having a plurality of hairs that contact the inner surface of the belt-like member, and wherein the second cleaning member is formed of an elastic plate, the second cleaning member extending upstream in a direction of movement of the inner surface of the belt-like member, an end of the second cleaning member contacting the inner surface of the belt-like member.

7. The image forming apparatus according to claim 4, wherein the first cleaning member is a brush having a plurality of hairs that contact the inner surface of the belt-like member, and wherein the second cleaning member is formed of an elastic plate, the second cleaning member extending upstream in a direction of movement of the inner surface of the belt-like member, an end of the second cleaning member contacting the inner surface of the belt-like member.

8. The image forming apparatus according to claim 5, wherein the plurality of hairs of the first cleaning member are formed of an insulating material and undergo frictional electrification by contacting the belt-like member.

9. The image forming apparatus according to claim 6, wherein the plurality of hairs of the first cleaning member are formed of an insulating material and undergo frictional electrification by contacting the belt-like member.

10. The image forming apparatus according to claim 7, wherein the plurality of hairs of the first cleaning member are formed of an insulating material and undergo frictional electrification by contacting the belt-like member.

* * * * *